_United States Patent_ [19]

Schwartz et al.

[11] Patent Number: 5,003,031

[45] Date of Patent: Mar. 26, 1991

[54] POLYIMIDES AND CO-POLYIMIDES BASED ON DIOXYDIPHTHALIC ANHYDRIDE

[75] Inventors: Willis T. Schwartz; Jeffrey S. Stults, both of Grand Island, N.Y.

[73] Assignee: Occidental Chemical Corporation, Niagara Falls, N.Y.

[21] Appl. No.: 352,071

[22] Filed: May 15, 1989

[51] Int. Cl.$^5$ .................. C08G 63/00; C08G 69/26; C08G 75/00; C07D 307/89

[52] U.S. Cl. .................. 528/188; 528/125; 528/126; 528/128; 528/173; 528/182; 528/208; 528/220; 528/224; 528/229; 528/329.1; 528/351; 528/353; 549/241

[58] Field of Search .............. 528/188, 125, 126, 128, 528/173, 182, 208, 220, 224, 229, 329.1, 351, 353; 549/241

[56] References Cited

U.S. PATENT DOCUMENTS

| | | | |
|---|---|---|---|
| 4,448,925 | 5/1984 | Hanson | 528/188 |
| 4,697,023 | 9/1987 | Schwartz et al. | 549/241 |
| 4,755,585 | 7/1988 | Hanson et al. | 528/188 |
| 4,808,731 | 2/1989 | Berdahl et al. | 549/241 |
| 4,837,404 | 6/1989 | Schwartz | 549/241 |
| 4,855,391 | 8/1989 | Berdahl et al. | 528/188 |
| 4,868,316 | 9/1989 | Schwartz, Jr. | 549/241 |
| 4,870,194 | 9/1989 | Molinaro et al. | 549/241 |
| 4,943,642 | 7/1990 | Stults et al. | 549/241 |
| 4,946,985 | 8/1990 | Stults | 549/241 |
| 4,948,904 | 8/1990 | Stults | 549/241 |

FOREIGN PATENT DOCUMENTS

| | | |
|---|---|---|
| 0288974 | 11/1988 | European Pat. Off. |
| 0308863 | 3/1989 | European Pat. Off. |
| 8901935 | 3/1989 | World Int. Prop. O. |

_Primary Examiner_—John Kight, III
_Assistant Examiner_—P. Hampton Hightower
_Attorney, Agent, or Firm_—James F. Tao; Arthur S. Cookfair

[57] ABSTRACT

Novel polyimides and co-polyimides are prepared by the condensation polymerization of an aryl diamine with dioxydiphthalic anhydride or a mixture thereof with oxydiphthalic anhydride. The polyimides and co-polyimides prepared exhibit a low moisture absorption and improved dielectric properties and can be tailored to provide a composition having desirable mechanical properties, specifically, rigidity.

12 Claims, No Drawings

POLYIMIDES AND CO-POLYIMIDES BASED ON DIOXYDIPHTHALIC ANHYDRIDE

BACKGROUND OF THE INVENTION

This invention relates to polyimides which are prepared from dioxydiphthalic anhydrides. Polyimides are used for various purposes including films, coatings, and molded articles. As a class, the polyimides are characterized by excellent physical properties, such as heat resistance, high impact strength and wear resistance, and the like. They generally exhibit good chemical resistance to a wide range of solvents Their excellent retention of mechanical and other physical properties at high temperatures is attributable, at least in part, to the fused-ring nature of the aromatic monomers from which the polymers are formed. The properties of polyimides can be varied depending on the specific selection of dianhydrides and diamines employed. It will be generally appreciated by those skilled in the art that a need exists for a broader selection of polyimides based on the various properties needed for applications in the electrical, electronics, automotive, aerospace, and packaging industries The polyimides of this invention are based on the use of a novel dianhydride reactant, dioxydiphthalic anhydride, optionally in combination with an oxydiphthalic anhydride.

The preparation of oxydiphthalic anhydride and its use in the preparation of polyimides is known. Various methods for the preparation of oxydiphthalic anhydrides have been described in the chemical literature. Such a method, shown to be useful in the preparation of oxydiphthalic acids and anhydrides, involves the oxidation of tetramethyl diphenyl ethers. See Kolesnikov, G. S. et al *Vysokomol. Soyed*, A9, 612–18 (1967); Marvel, C. S. et al, *J. Am. Chem. Soc.*, 80, 1197 (1958); and Latrova, Z. N. et al, *Volokna Sin. Polim.*, 15–24 (1970).

Three Japanese patents to Mitsui describe preparations based on reactions of substituted phthalic anhydrides. Japanese Patent Document 80/136, 246 (Chem. Abst. 95:42680) teaches the coupling of 4-nitrophthalic anhydride in the presence of sodium nitrite to form oxy-diphthalic anhydride. In Japanese Patent Document 80/122, 738 (Chem. Abst. 94..83799) Mitsui disclose the reaction of 4-halophthalic acid or anhydride with a base to yield oxydiphthalic anhydride. In Japanese Patent Document 80/127, 343 (Chem. Abstr. 94:191942) the reaction of 4-halophthalic anhydride, $Na_2CO_3$ and $NaNO_2$ in dimethyl sulfoxide to form 4,4'-dihydroxydiphthalylic phthalylic anhydride is described.

German Patent No. 2,416,594 (1975) discloses the coupling of 3-nitrophthalic anhydride in the presence of metal nitrites, such as sodium nitrite to form oxydiphthalic anhydride.

Markezich, R. L. and Zamek, O.S., *J. Org. Chem.*, 42, 3431 (1977) describe reaction of 4-nitrophthalimide with potassium fluoride in dimethylsulfoxide to form the corresponding oxydiphthalimide which may be converted by hydrolysis to form the acid and ring closure to form the dianhydride.

U.S. Pat. No. 4,697,023 to Schwartz and Pawlak, discloses the preparation of oxydiphthalic anhydrides by reacting a halophthalic anhydride with water and an alkali metal compound such as KF, CsF, or $K_2CO_3$ in the presence of a polar aprotic solvent.

U.S. Pat. No. 4,794,157 to Berdahl and Nye discloses polyimides prepared by the intercondensation of an aryldiamine with a mixture of oxy-diphthalic anhydride and an aromatic bis(ether anhydride), such as 2,2-bis[4-(3,4-dicarboxyphenoxy)-phenyl]propane dianhydride. The polyimides prepared are described as tough flexible transparent copolymers having Tg's from about 217° C. to 300° C.

SUMMARY OF THE INVENTION

The polyimides of the present invention comprise recurring imide structural units of the following formula:

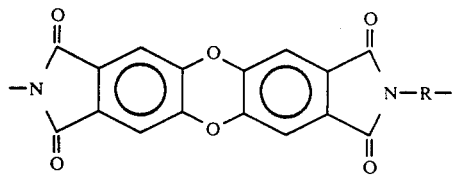

and, optionally, in addition to the above structural unit, recurring imide structural units characterized by the general structure:

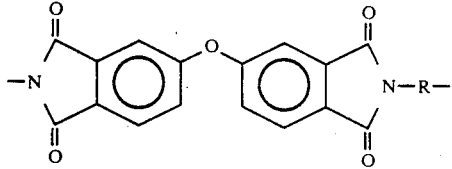

where R is a divalent organic radical selected from the group consisting of (a) aromatic hydrocarbon radicals having from 6 to about 20 carbon atoms and halogenated derivatives thereof, (b) alkylene radicals and cycloalkylene radicals having from 2 to about 20 carbon atoms, $C_{(2-8)}$ alkylene terminated polydiorganosiloxanes, and (c) divalent radicals included within the formula

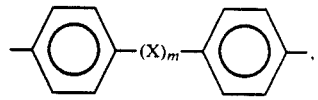

X is a member selected from the class consisting of divalent radicals of the formulas,

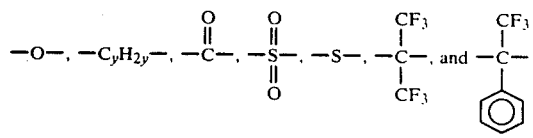

m is 0 or 1, y is a whole number from 1 to 5.

The present polyimides are prepared by condensation polymerization of essentially equimolar amounts of at least one dianhydride reactant comprising dioxydiphthalic anhydride of the formula

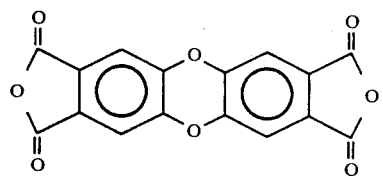

and at least one diamine reactant of the formula NH₂RNH₂ when R is as defined above. Mixtures of diamines may be employed. A small amount of a mono-anhydride or a mono-amine may be added as a chain stopper, to limit the molecular weight. The dianhydride reactant may include, in addition to dioxydiphthalic anhydride, one or more other dianhydrides, judiciously selected to modify the properties of the final polyimide. In a preferred embodiment, the dianhydride reactant comprises a mixture 20-100 mole percent of dioxydiphthalic anhydride and 80-0 mole percent of oxydiphthalic anhydride, preferably 4,4'-oxydiphthalic anhydride, of the formula

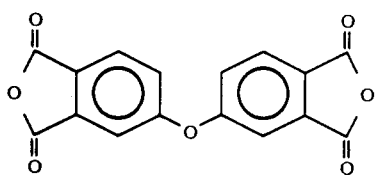

The preferred diamines are aromatic diamines, such as, 4,4'-oxydianiline; 4,4'-methylene dianiline; and phenylenediamine.

Dioxydiphthalic anhydride, because of its rigid, oxygen-bridged structure, will react with conventional diamines, without flexibilizing bridging units, to form polyimides characterized by a very high glass transition temperature (Tg) and high chemical resistance. Such polyimides would be particularly advantageous for applications where property retention at high temperature and excellent resistance to solvents are required, such as, wire insulation, electrical circuit boards and micro-electronic applications, and as a substrate for vapor deposition. When copolymerized with oxydiphthalic anhydride, improvements in processability may be achieved because of the flexible bridging characteristics of the latter. The glass transition temperature of the composition can be varied between the extremes of the pure dianhydride-diamine compositions and the properties tailored to meet the demand. Further variation in properties can be achieved by proper selection of the diamine. In a preferred embodiment the dianhydride component is a mixture of 20-80 mole percent of dioxydiphthalic anhydride and 80-20 mole percent of oxydiphthalic anhydride.

The polymers and copolymers of the present invention can be prepared by various polymerization methods. One such method is solution polymerization in an essentially anhydrous organic solvent such as dimethylacetamide, N-methylpyrrolidone, dimethylformamide, dichlorobenzene, orthochlorophenol, and the like. The procedure may be carried out by mixing the reactants, that is the diamine and dianhydride(s), in substantially equimolar proportions in the solvent and stirring the mixture for a period of time necessary to allow the reaction to take place. The resultant polyamic acid solution may then be poured onto a suitable substrate such as a glass plate, and the solvent removed by evaporation. The coating may then be heated, for example in a programmable oven, to a temperature in the range of 300-350° C. to imidize the polyamic acid.

The following examples are provided to further illustrate the invention in the manner in which it may be carried out. It will be understood, however, that the specific details given in the examples have been chosen for purposes of illustration only and are not to be construed as limiting the invention. In the examples, unless otherwise indicated, all parts and percentages are by weight and all temperatures are in degrees Celsius.

EXAMPLE 1

Preparation of Polyimide 4,4'-Oxydianiline (ODA) (.05g, 0.0025 mole) was dissolved in 7.4 grams of dimethylacetamide. Dioxydiphthalic anhydride (0.81g, 0.0025 mole) was added and the mixture stirred overnight to yield a clear, extremely thick solution of the polyamic acid. The inherent viscosity was found to be 1.89.

The polyamic acid solution was coated on a soda-lime glass plate and placed in a chamber with dry nitrogen passing through it to remove most of the dimethylacetamide. The plate was then transferred to an oven with a heating program of 100° C. for one hour followed by one hour each at 200 and 300° C.

The cured polyimide film had good integrity, creasibility and toughness. No glass transition temperature could be detected by DSC at temperatures to 450° C.

EXAMPLE 2

Preparation of Copolyimide 4,4'-Oxydianiline (0.5g, 0.0025 mole) was dissolved in 7.33g of dimethylacetamide. To this solution was added 0.194g (0.000625 mole) of oxydiphthalic anhydride and 0.608g (0.001825 mole) of dioxydiphthalic anhydride. The solution was allowed to react overnight, with stirring, to form a polyamic acid having an inherent viscosity of 1.26.

Following the procedure of Example 1, a film of the polyamic acid was formed and imidized. The cured polyimide film was characterized by good integrity, creasibility and toughness. No glass transition temperature could be detected by DSC at temperatures to 450° C.

EXAMPLES 3-4

Preparation of Co-polyimide

The procedure of Example 2 was repeated except that the molar ratio of dioxydiphthalic anhydride (DODPA): oxydiphthalic anhydride (ODPA) was varied as shown in the Table below. The polyamic acid formed using equimolar amounts of DODPA and ODPA had an inherent viscosity of 0.94 while the polyamic acid formed from a 1:3 molar ration of DODPA:ODPA had an inherent viscosity of 1.29. Each of the cured polimide films was tough and creasible and characterized by the physical properties shown in the table.

EXAMPLE 5C

For purposes of comparison, a polyimide was prepared, following the general procedure of Examples 2-4, but using oxydiphthalic anhydride as the only anhydride component.

TABLE

| Dianhydride Compositon (ratio DODPA:ODPA) | Examples | | | | |
|---|---|---|---|---|---|
| | 1<br>100% DODPA | 2<br>3:1 | 3<br>1:1 | 4<br>1:3 | 5C<br>100 ODPA % |
| Tg (°C.) | none detected | none detected | 300 | 270 | 265 |
| TGA - Temperature 10% wt loss (°C.) | 580 | 565 | 580 | 570 | 570 |
| Tensile Strength (psi) (ASTM D882) | 10,500 | 18,800 | 17,800 | 17,100 | 19,400 |
| Tensile Modulus (psi) (ASTM D882) | 530,200 | 469,600 | 514,100 | 376,800 | 497,500 |
| Elongation (%) (ASTM D882) | 8.4 | 13.1 | 9.8 | 14.3 | 13.2 |

EXAMPLE 6

Preparation of Dioxydiphthalic Anhydride

A solution of 21.7 grams (0.1 mole) of 4,5-dichlorophthalic anhydride in 40 grams of sulfolane was heated and maintained at 210-215° C. while 0.215 grams of tetraphenylphosphonium bromide was added followed by the incremental addition of 13.82 grams (0.1 mole) of potassium carbonate over a period of about 4 hours. The temperature was maintained an additional hour and the reaction mixture was then cooled to room temperature. Acetone (100 ml) was added and mixed. The reaction mixture was filtered and the solids washed consecutively with another 100 ml of acetone, two 100 ml portions of water, and again with a 100 ml of acetone, to yield about 15 grams of brown solid. After drying, the solid was recrystallized from about 225 grams of 1,2,4-trichlorobenzene to yield 12.5 grams of a tan colored crystalline solid. Mass spectral analysis indicated the product to have a molecular weight of 324 with a fragmentation consistent with dioxydiphthalic anhydride. The identification of dioxydiphthalic anhydride was confirmed by infra-red analysis and $C^{13}$ NMR (CP/MAS).

EXAMPLE 7

Preparation of Dioxydiphthalic Anhydride 4,5-Difluorophthalic anhydride (18.4 grams, 0.1 mole) was dissolved in 40 grams of anhydrous sulfolane and heated to 165° C. with stirring. Tetraphenylphosphonium bromide (0.184 grams, 0.0004 mole) and 1.8 grams (0.10 mole) of water were added and the temperature increased to 200° C. Anhydrous potassium fluoride (23.3 grams, 0.4 mole) was added with stirring. The reaction mixture was held at about 200° C. with stirring for about 3½ hours at which time another 0.2 grams of water was added and the reaction mixture was maintained at temperature for an additional hour. The reaction mixture was cooled to less than 150° C. and 35 grams of acetone added and the solids filtered off. The solids were washed with acetone followed by three 100 ml washes with distilled water. The solid material was dried at 150° C. for 16 hours to yield 15.5 grams (95.7% yield) of dioxydiphthalic anhydride.

What is claimed is:

1. A polyimide comprising chemically combined units of the formula

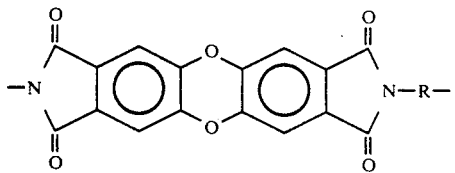

where R is a divalent organic radical selected from the group consisting of
(a) aromatic hydrocarbon radicals having from 6 to about 20 carbon atoms and halogenated derivatives thereof,
(b) alkylene radicals and cycloalkylene radicals having from 2 to about 20 carbon atoms, $C_{(2-8)}$ alkylene terminated polydiorganosiloxanes, and
(c) divalent radicals included within the formula

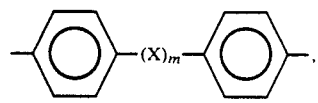

wherein X is a member selected from the class consisting of divalent radicals of the formulas,

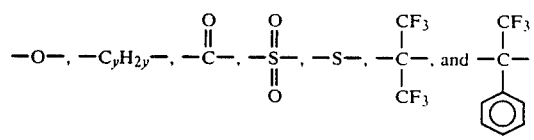

m is 0 or 1, y is a whole number from 1 to 5.

2. A polymide according to claim 1 comprising chemically combined units of the formula

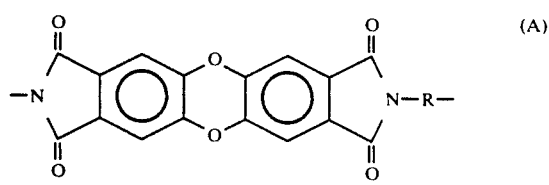

and

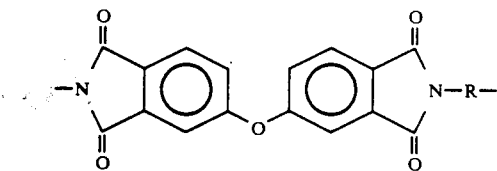

(B)

where R is as defined.

3. A polyimide comprising the intercondensation reaction product of substantially equimolar amounts of
   (a) a dianhydride reactant comprising 4,5,4', 5'-dioxydiphthalic anhydride and
   (b) an organic diamine, or mixture of organic diamine, of the formula $NH_2RNH_2$ wherein R is a divalent organic radical selected from the group consisting of
   (i) aromatic hydrocarbon radicals having from 6 to about 20 carbon atoms and halogenated derivatives thereof,
   (ii) alkylene radicals and cycloalkylene radicals having from 2 to about 20 carbon atoms, $C_{(2-8)}$ alkylene terminated polydiorganosiloxanes, and
   (iii) divalent radicals included within the formula

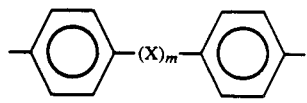

wherein X is a member selected from the class consisting of divalent radicals of the formulas,

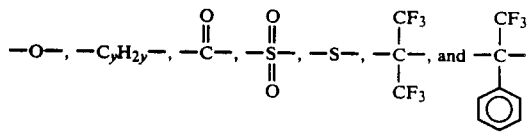

m is 0 or 1, y is a whole number from 1 to 5.

4. A polyimide according to claim 3 wherein the sole dianhydride reactant is 4,5,4', 5'-dioxydiphthalic anhydride.

5. A polyimide according to claim 4 wherein R is an aromatic hydrocarbon radical or halogenated derivatives thereof.

6. A polyimide according to claim 4 wherein R is a divalent radical included within the formula

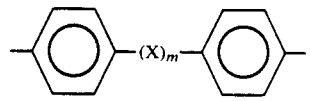

wherein X is a member from the class consisting of divalent radicals of the formulas,

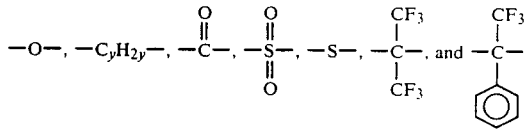

m is 0 or 1, y is a whole number from 1 to 5.

7. A polyimide according to claim 6 wherein the organic diamine is 4,4'-oxydianiline.

8. A polyimide according to claim 3 wherein the dianhydride reactant comprises 20–100 mole percent of 4,5,4', 5'-dioxydiphthalic anhydride and 80–0 mole percent of 4,4'-oxydiphthalic anhydride.

9. A polyimide according to claim 8 wherein R is a divalent radical included within the formula

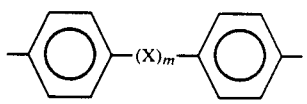

wherein X is a member selected from the class consisting of divalent radicals of the formulas,

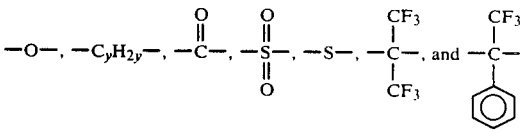

m is 0 or 1, y is a whole number from 1 to 5.

10. A polyimide according to claim 9 wherein the organic diamine is 4,4'-oxydianiline.

11. A polyimide comprising the reaction product substantially equimolar amounts of 4,5,4', 5'-dioxydiphthalic anhydride and 4,4'-oxydianiline.

12. A polyimide comprising the reaction product of substantially equimolar amounts of 4,4'-oxydianiline and a dianhydride mixture comprising 4,5,4', 5'-dioxydiphthalic anhydride and 4,4'-oxydiphthalic anhydride.

* * * * *